US009661509B2

(12) United States Patent
Anepu et al.

(10) Patent No.: US 9,661,509 B2
(45) Date of Patent: May 23, 2017

(54) LOW MOBILITY STATES AND PROCEDURES

(75) Inventors: Bhaskar Anepu, Hummelstown, PA (US); Diana Pani, Montreal (CA); Christopher Cave, Dollard-des-Ormeaux (CA); Sylvie Gomes, Douglaston, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 81 days.

(21) Appl. No.: 13/638,735

(22) PCT Filed: Apr. 1, 2011

(86) PCT No.: PCT/US2011/030872
§ 371 (c)(1),
(2), (4) Date: Dec. 11, 2012

(87) PCT Pub. No.: WO2011/123744
PCT Pub. Date: Oct. 6, 2011

(65) Prior Publication Data
US 2013/0188503 A1 Jul. 25, 2013

Related U.S. Application Data

(60) Provisional application No. 61/320,600, filed on Apr. 2, 2010.

(51) Int. Cl.
*H04W 4/00* (2009.01)
*H04W 24/02* (2009.01)
(Continued)

(52) U.S. Cl.
CPC ........... *H04W 24/02* (2013.01); *H04W 24/10* (2013.01); *H04W 36/08* (2013.01);
(Continued)

(58) Field of Classification Search
CPC .............................. H04W 36/12; H04W 36/16
See application file for complete search history.

(56) References Cited

U.S. PATENT DOCUMENTS 6,067,460 A 5/2000 Alanara et al.
6,731,932 B1* 5/2004 Rune et al. ................. 455/432.1
(Continued)

FOREIGN PATENT DOCUMENTS

CN 1183702 A 6/1998
CN 101627652 A 1/2010
(Continued)

OTHER PUBLICATIONS

3rd Generation Partnership Project(3GPP), R2-101406, "Discussion on MTC Idle States", Alcatel-Lucent Shanghai Bell, Alcatel-Lucent, 3GPP TSG-WG #69, US, Feb. 22-26, 2010, 1-3.
(Continued)

*Primary Examiner* — Brandon Renner
(74) *Attorney, Agent, or Firm* — Condo Roccia Koptiw LLP

(57) ABSTRACT

Mobility states are defined in order to prevent excess signaling overhead and to conserve power on a wireless transmit/receive unit (WTRU) in a wireless network. The WTRU may determine that is operating in a low mobility state based on triggers related to the frequency of movement of the WTRU between network cells. The WTRU may change cells less frequently in a low or no mobility state than in a normal mobility state. Upon determining that the WTRU is in the low or no mobility state, the WTRU may configure mobility procedures associated with the low or no mobility state in order to conserve power and other network resources. The WTRU may coordinate its mobility state with the network.

36 Claims, 6 Drawing Sheets

(51) Int. Cl.
  *H04W 24/10* (2009.01)
  *H04W 36/08* (2009.01)
  *H04W 52/02* (2009.01)
  H04W 36/32 (2009.01)
(52) U.S. Cl.
  CPC ........ *H04W 52/0212* (2013.01); *H04W 4/005* (2013.01); *H04W 36/32* (2013.01)

(56) References Cited

U.S. PATENT DOCUMENTS

| | | | |
|---|---|---|---|
| 8,472,956 B2 | 6/2013 | Wang et al. | |
| 2003/0013444 A1* | 1/2003 | Watanabe et al. | 455/435 |
| 2005/0009548 A1* | 1/2005 | Kelley et al. | 455/509 |
| 2006/0111110 A1* | 5/2006 | Schwarz et al. | 455/439 |
| 2006/0128371 A1* | 6/2006 | Dillon et al. | 455/423 |
| 2006/0160558 A1* | 7/2006 | Kim et al. | 455/522 |
| 2006/0199591 A1 | 9/2006 | Klatt | |
| 2006/0234676 A1* | 10/2006 | Harris et al. | 455/410 |
| 2007/0086359 A1 | 4/2007 | Yaqub | |
| 2007/0183344 A1* | 8/2007 | Joshi | 370/254 |
| 2007/0230394 A1 | 10/2007 | Wang et al. | |
| 2008/0045211 A1* | 2/2008 | Chun et al. | 455/434 |
| 2008/0220782 A1* | 9/2008 | Wang et al. | 455/436 |
| 2008/0304434 A1* | 12/2008 | Giaretta et al. | 370/313 |
| 2009/0143093 A1 | 6/2009 | Somasundaram et al. | |
| 2010/0124191 A1* | 5/2010 | Vos et al. | 370/328 |
| 2010/0124934 A1* | 5/2010 | Mach | 455/456.1 |
| 2010/0177717 A1* | 7/2010 | Sung et al. | 370/329 |
| 2011/0143808 A1* | 6/2011 | Krco et al. | 455/525 |
| 2011/0201279 A1* | 8/2011 | Suzuki et al. | 455/67.11 |
| 2013/0013793 A1* | 1/2013 | Sanchez Herrero | 709/227 |
| 2013/0021970 A1* | 1/2013 | Lei | 370/328 |

FOREIGN PATENT DOCUMENTS

| | | |
|---|---|---|
| EP | 0812119 A2 | 12/1997 |
| JP | 9-331571 A | 12/1997 |
| JP | 2009531973 A | 9/2009 |
| JP | 2009-284252 A | 12/2009 |
| KR | 10-2009-0075978 A | 7/2009 |
| KR | 10-2009-0115180 A | 11/2009 |
| WO | WO-9962285 A1 | 5/1999 |
| WO | WO 99/62285 A1 | 12/1999 |
| WO | WO 2007/088381 A1 | 8/2007 |
| WO | WO-2007145035 A1 | 12/2007 |
| WO | WO 2008/094681 A1 | 8/2008 |
| WO | WO-2008143563 A1 | 11/2008 |
| WO | WO-2009091303 A1 | 7/2009 |
| WO | WO 2009/141001 A1 | 11/2009 |
| WO | WO-2009141001 A1 | 11/2009 |
| WO | WO-2011123744 A1 | 10/2011 |
| WO | WO-2011123744 A1 | 10/2011 |

OTHER PUBLICATIONS

3rd Generation Partnership Project(3GPP), R2-101414, "Power Saving for MTC Devices", LG Electronics Inc., 3GPP TSG-RAN WG2 #69, San Francisco, USA, Feb. 22-26, 2010, 1-2.

3rd Generation Partnership Project(3GPP), R2-102033, "Discussion on MTC Idle States", Alcatel-Lucent Shanghai Bell, Alcatel-Lucent, 3GPP TSG-WG#69-bis, Beijing, Apr. 12-16, 2010, 1-4.

Bontu et al., "DRX Mechanism for Power Saving in LTE", Nortel, IEEE Communications Magazine, vol. 47, Issue: 6, Jun. 2009, 48-55.

Lee et al., "MAC Sleep Mode Control Considering Downlink Traffic Pattern and Mobility", School of Electrical Engineering & Computer Science, Seoul National University, Seoul Korea, IEEE, vol. 3, May 30-Jun. 1, 2005, 5 pages.

Yang et al., "Adaptive Discontinuous Reception Mechanism for Power Saving in UMTS", IEEE Communication Letters, vol. 11, No. 1, Jan. 2007, 40-42.

Zhang et al., "Energy Management in the IEEE 802.16e MAC", IEEE Communication Letters, vol. 10, No. 4, Apr. 2006, 311-313.

Zhou et al., "Performance Analysis of Power Saving Mechanism with Adjustable DRX Cycles in 3GPP LTE", Key Laboratory of Universal Wireless Communications, Ministry of Education, Beijing University of Posts & Telecommunications, IEEE, Sep. 21-24, 2008, 1-5.

RP-090991, 3GPP Work Item for Release 10, RAN Improvements for Machine-type Communications, TSG-RAN #45, Sep. 15-18, 2009, Sevilla, Spain.

3rd Generation Partnership Project (3GPP), TS 22.368 V1.1.1 (Nov. 2009), 3rd Generation Partnership Project; Technical Specification Group Services and System Aspects; Service requirements for machine-type communications; Stage 1, (Release 10), 23 pages.

3rd Generation Partnership Project (3GPP), TS 25.331 3GPP TS 25.331 V9.1.0 (Dec. 2009) 3rd Generation Partnership Project; Technical Specification Group Radio Access Network; Radio Resource Control (RRC); Protocol Specification, (Release 9), 1759 pages.

3rd Generation Partnership Project (3GPP) TS 36.331 V9.1.0 (Dec. 2009), 3rd Generation Partnership Project; Technical Specification Group Radio Access Network; Evolved Universal Terrestrial Radio Access (E-UTRA) Radio Resource Control (RRC); Protocol specification, (Release 9), 233 pages.

3rd Generation Partnership Project (3GPP) TS 25.304 V9.0.0 (Dec. 2009), 3rd Generation Partnership Project; Technical Specification Group Radio Access Network; User Equipment (UE) procedures in idle mode and procedures for cell reselection in connected mode, (Release 9), 49 pages.

3rd Generation Partnership Project (3GPP), TS 36.304 3GPP TS 36.304 V9.1.0 (Dec. 2009) 3rd Generation Partnership Project; Technical Specification Group Radio Access Network; Evolved Universal Terrestrial Radio Access (E-UTRA); User Equipment (UE) procedures in idle mode, (Release 9), 31 pages.

3rd Generation Partnership Project (3GPP), R2-101249, "Scope of Ran's Optimization for MTC", CMCC, CATR, CATT, Huawei, ZTE, 3GPP TSG-RAN WG2 Meeting #69, San Francisco, USA, Feb. 22-26, 2010, 2 pages.

3rd Generation Partnership Project (3GPP), TS 22.368 V2.0.0, "Technical Specification Group Services and System Aspects, Service Requirements for Machine-Type Communications, Stage 1 (Release 10)", Mar. 2010, pp. 1-22.

\* cited by examiner

LOW MOBILITY STATES AND PROCEDURES

CROSS-REFERENCE TO RELATED APPLICATIONS

This application is a National Stage entry under 35 U.S.C. §371 of Patent Cooperation Treaty Application No. PCT/US2011/030872, filed Apr. 1, 2011, which claims the benefit of U.S. Provisional patent application Ser. No. 61/320,600 filed Apr. 2, 2010, the contents of which are hereby incorporated by reference herein.

TECHNICAL FIELD

This application is related to mobility procedures for wireless communication systems and devices.

BACKGROUND

Typical wireless data and voice networks cover large geographical regions. A user may travel through the geographical region of the network. However, the network may need to stay informed of the user equipment (UE) at any given time. Additionally, in order to permit a UE to quickly connect to a network resource, mobility procedures such as cell reselection, tracking area updates, and the like were developed to provide support for UE mobility. A UE is designed to implement the mobility procedures to allow it to quickly connect to the network and to keep the network informed of it current location.

Machine to machine (M2M) communication is a form of data communication between entities or machines that does not necessarily need human intervention. Respective communication networks may include any number of Machine Type Communication (MTC) devices. Metering devices or tracking devices are typical examples of MTC devices. As used herein, the term user equipment (UE) may include MTC devices.

With the deployment of M2M systems, a wide variety of devices with diverse capabilities may operate under different conditions. The capabilities of the MTC devices may vary, and the capabilities of the MTC devices may depend on the requirements of one or more MTC applications. Categories of features of machine type communications may include one or more of: Time Controlled, Time Tolerant, Packet Switched (PS) Only, Online Small Data Transmissions, Offline Small Data Transmissions, Mobile Originated Only, Infrequent Mobile Terminated, MTC Monitoring, Offline Indication, Jamming Indication, Priority Alarm Message (PAM), Extra Low Power Consumption, Secure Connection, Location Specific Trigger and Group Based MTC Features including Group Based Policing and Group Based Addressing.

SUMMARY

Methods and devices for optimizing utilization of network resources and UE are described herein. In order to prevent excess signaling overhead and to conserve power on the UE, new mobility procedures may be defined for devices in low mobility or no mobility states. A wireless transmit/receive unit (WTRU) may determine that is operating in a low mobility state based on triggers related to the frequency of movement of the WTRU between network cells. The WTRU may change cells less frequently in a low or no mobility state than in a normal mobility state. Upon determining that the WTRU is in the low or no mobility state, the WTRU may configure mobility procedures associated with the low or no mobility state in order to conserve power and other network resources.

The WTRU may receive the mobility procedures or parameters related to the mobility procedures from the wireless network. The procedures may be designed to optimize power consumption or signaling overhead for the defined mobility states. The WTRU may detect triggers related to signal quality or other network parameters to determine if it should transition into or out of a low or no mobility state. The WTRU may inform the network that it has changed mobility states or it may request permission from the network to change mobility states.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
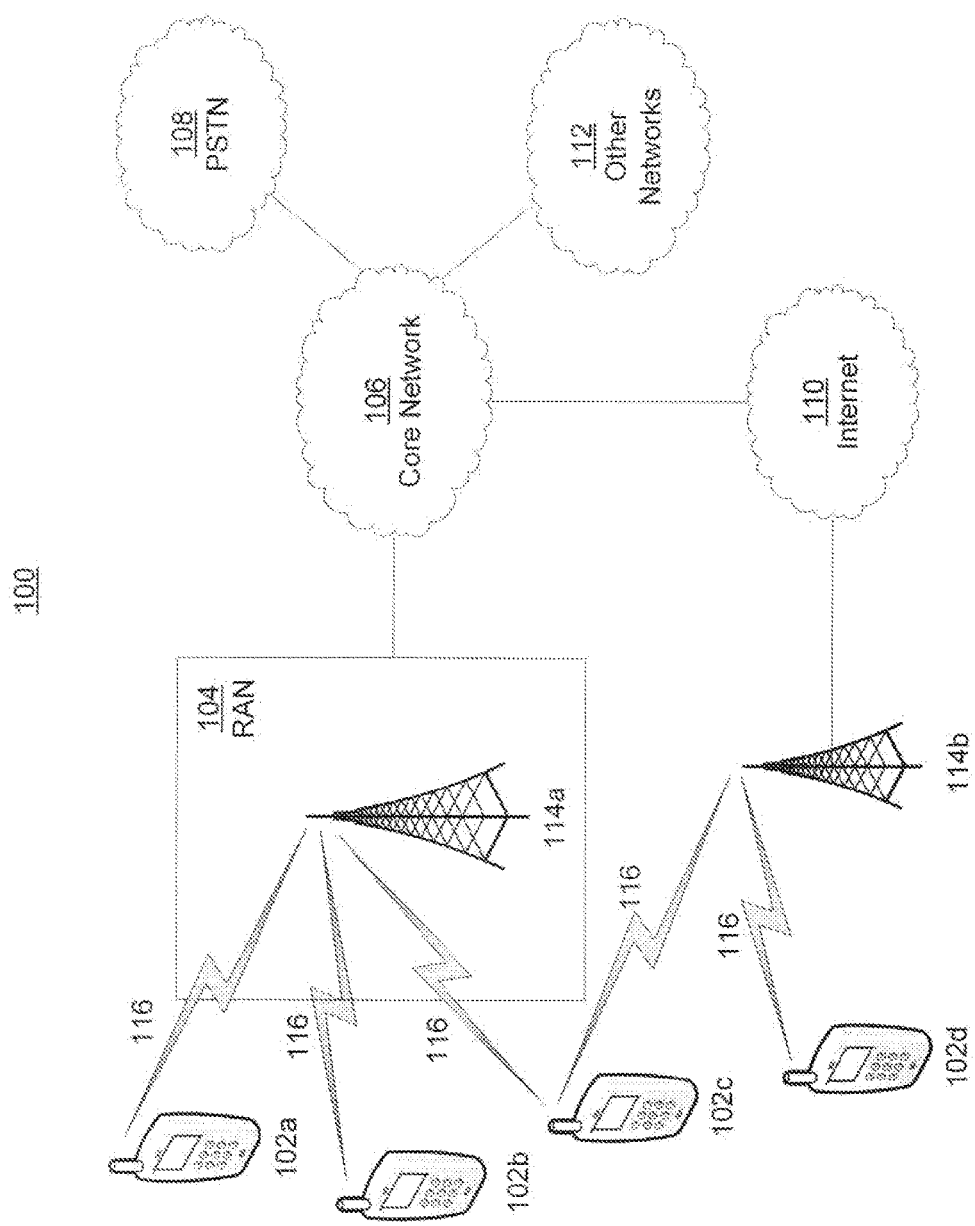
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
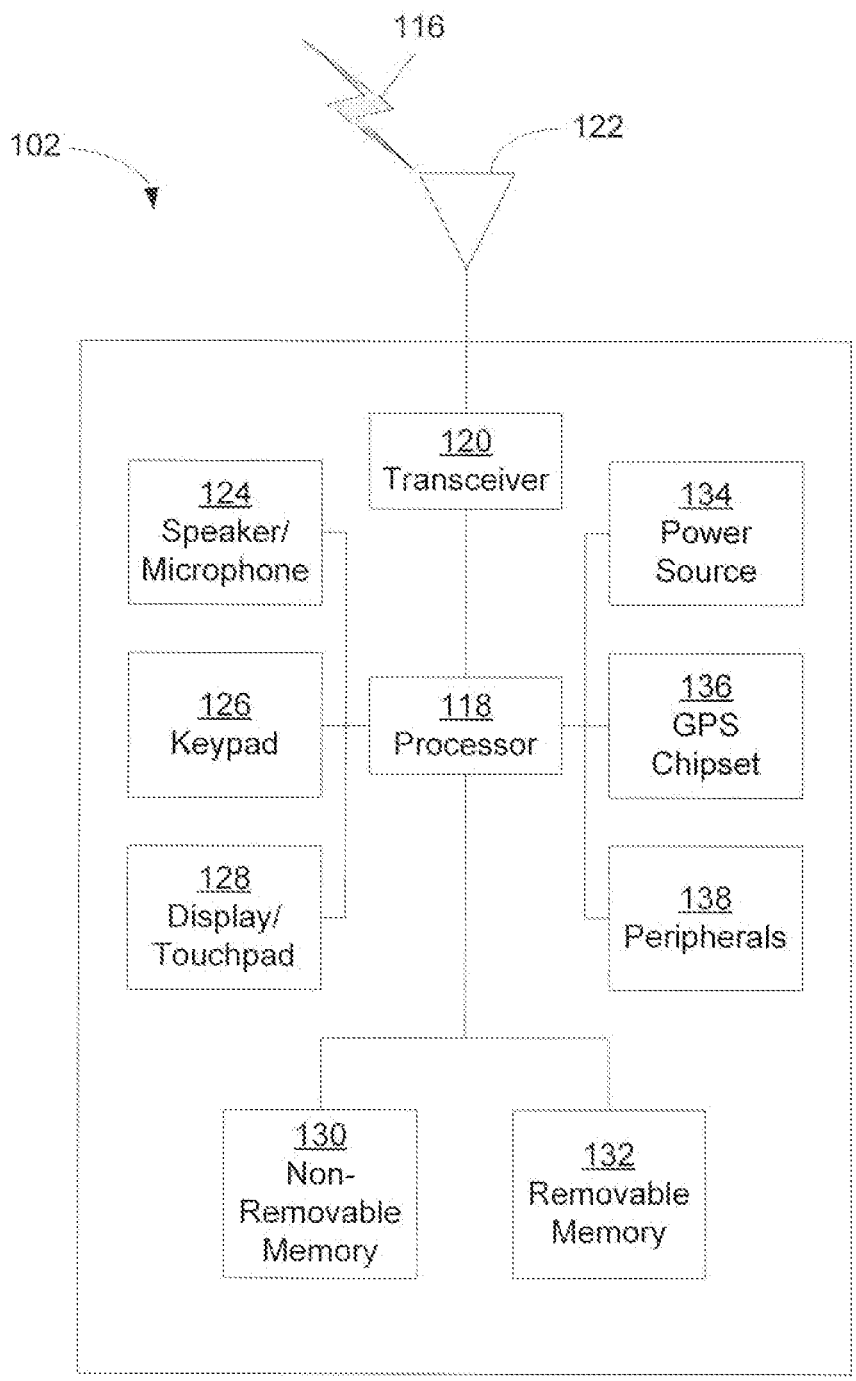
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
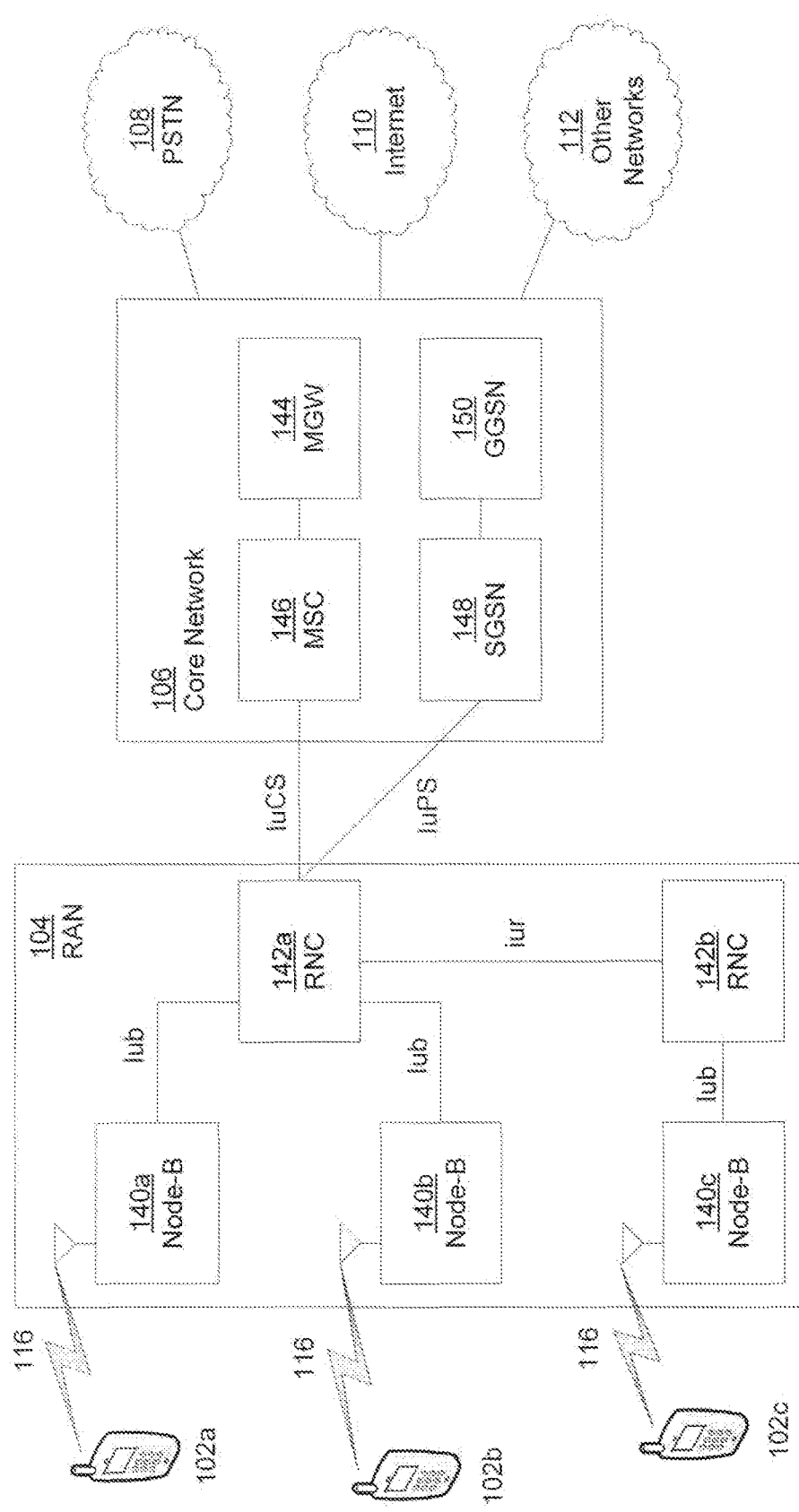
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

For low mobility or no mobility devices, some of the mobility procedures defined for normal mobile devices may be unnecessary and may waste resources. Thus, when low or no mobility types of devices perform all the mobility procedures, the results may be a waste of unnecessary network resources and an unnecessary consumption of the device's power. This can be of significant consequence if the M2M devices are power constrained, e.g., if the device runs on limited battery power and/or are deployed in locations that may not be easily accessible or not accessible at all. Disclosed are various methods of optimization for such no/low mobility devices, including but not limited to: defining new UE mobility states, optimization of the mobility procedures in these states, configuration of the devices in these states, and transitioning triggers between mobility states.

It is noted that even though the terminology used herein is that of UMTS and/or Long Term Evolution (LTE), all the concepts are equally applicable to other wireless technologies such as Long Term Evolution-Advanced (LTE-A), Global System for Mobile Communications (GSM) or any other wireless technology. As an example it is understood, that if the terminology PSC is used for universal mobile telecommunications system (UMTS), this is the equivalent of PCI in the LTE. It is also understood that BCCH (Broadcast Control Channel) and the (SI) System Information elements/segments and MIB (Master Information Block) apply to UMTS, LTE, GSM or any other wireless technology using a similar system information broadcast method.

It is also understood that the term cell is equivalent to any wireless base station (Node-B (NB), evolved Node B (eNB), Home Node B (HNB), Home evolved Node B (HeNB), base transceiver station (BTS), radio base station (RBS), Access Point, etc.). Hence the concept of cell also maps to frequency and any Radio Access Technology (RAT). i.e., A UE switching between different cells can also mean a UE switching between different frequencies and/or RATs. A "resource" hereafter means any resource that a UE or the network (NW) uses in order to communicate. Also, the term "home cell" is used to refer to the cell on which the UE is initially camped or any preferred cell for this UE, or it may refer to a serving cell. In one example, this may be any serving cell in a macro layer/frequency and/or RAT. Alternatively, this may also be a HNB in UMTS or HeNB in LTE.

Even though the solutions described below refer to no or low mobility states they may be equally applicable to the high mobility state. Further, even though the states, configurations, procedures and triggers defined and used hereafter may be described with relation to MTC devices requiring mobility optimizations, they may be extended to other devices and more traditional user equipment, for example a cellular phone. The embodiments described herein may also be applicable to MTC features/requirements such as, but not limited to, Extra Low Power Consumption (e.g., devices that may be deployed in remote geographical locations that may be hard to access), Time Controlled (e.g., devices that may send/receive data at predefined periods of time) and Mobile Originated-Only (e.g., devices that communicate with the network when there is mobile-originated data).

New mobility states may be defined as well as idle mode procedures in these new states and in-state transitions. The states of the UE may include one, two or multiple new mobility states in idle mode for the UE. A normal mobility state may be a state in which the UE moves freely throughout cells within a network. A device in a normal mobility state may include mobility procedures that allow the UE to move between network cells on a regular or semi-regular basis. For example, a device may be configured to be in a normal mobility state when the device is moving between cells or may possibly move between cells. In another example, if it is unknown if a device will move between cells, the device may be configured to be in a normal mobility state. In an exemplary embodiment, the normal mobility state may be the default mobility state.

A low mobility state may be defined to be a state in which the device moves between network cells less frequently than it does when it is in the normal mobility state. For example, the low mobility state may be a state in which the UE is confined to a single network cell, or moving infrequently between cells, e.g., when the device is moving within a confined geographical region. A no mobility state may be a state wherein the device remains within a single network cell. For example, a no mobility state may correspond to no movement by the device. The no mobility state may be a state to which a UE transitions to when the device is stationary, for example for a specified amount of time. The no mobility state may correspond to a situation in which the UE is affixed to a certain physical location. Thus, it should be understood that the no mobility state is a subset of the low mobility state. A high mobility state may be a state in which the device moves between cells more frequently than in the normal mobility state. For example, a device may transition to a high mobility state when it is moving frequent or when the device is frequently moving across a significant number of cells or regions.

For example, the UE mobility states may be characterized by different functional aspects such as a frequency of a set of measurements, a length of extended discontinued reception (DRX) with corresponding monitoring of paging occasions, a frequency of location updates and/or a frequency of acquisition of system information. For example, a UE in a no mobility state may perform no measurements at all. A UE may perform fewer measurements in the low mobility state than it would in a normal state. Similarly, some timers, DRX cycle length and other configuration parameters may be scaled down, tailoring the parameters to the mobility state.

These characteristics and the behavior of a UE in these states are discussed in detail in the following subsections.

Several different mechanisms may be used for configuring a UE in a no or low mobility state. In an embodiment, the network may provide absolute values for parameters specific to a mobility state. The network may provide scaling factors that a UE may use in order to calculate values specific to a mobility state. The parameters may be specific to an MTC device or may be applicable to all UEs. For example, the MTC device may obtain the configuration parameters from the System Information of the serving cell. The parameters may be configured during registration with the network or any other form of dedicated signaling. The UE may be configured with the values during deployment. The parameters may be provided to the UE during its subscription to any MTC services or provided by an MTC server. Also, the user of a UE may configure the values via an interface available on the device.

To optimize a UE device, for example an MTC device, in its various mobility states, techniques are disclosed herein that allow a UE to perform a reduced set of measurements in each respective mobility state. Reference to the term measurement(s) or channel quality herein may include reference to received signal code power (RSCP), carrier to noise ratio (Ec/NO), common pilot channel (CPICH), reference signal received power (RSRP) and/or reference signal received quality (RSRQ). As described below, the UE may perform actions in the no or low mobility state. These actions may be performed independent of each other or in any combination.

In an embodiment for reduced measurement, a UE may perform serving cell and/or neighbor cell measurements less frequently than in other states. The frequency of measurements may be determined in various manners. For example, serving cell measurements may be performed once every 'N' DRX cycles, and the neighbor cell measurements may be performed once every 'M' DRX cycles. The values of 'M' and 'N' may be provided to or pre-configured in the UE. 'M' and 'N' may be equal to each other or may have different values. These values may be absolute numbers specific to the mobility states. The UE may derive these values from a single predefined number using mobility state specific scaling factors.

In another embodiment, the UE may perform serving cell and neighbor cell measurements periodically based on a timer. The timer may be the same for both serving cell and neighbor cells, or a first timer may be used for serving cells and a different timer may be used for neighbor cells. The timer may be state specific or the timer value for each state may be derived from a common timer using state specific scaling factors. The values for the no mobility timer and the low mobility timer may be different. For instance, a no mobility state UE may perform no measurements. In another example, the no mobility UE may perform measurements but the measurements may be performed less frequently than a UE in the low mobility state.

In another embodiment for reduced measurements, a UE may monitor the serving cell and trigger neighbor cell measurements when the serving cell measurement goes below a predefined threshold. In this scenario, the UE may perform no neighbor cell measurements while a serving cell measurement is above the predetermined threshold, or it may perform neighbor cell measurements less frequently then it would in the normal mobility state while the serving cell measurement is above the predetermined threshold. This threshold may be determined in a number of ways. For example, if the UE is a MTC device, the threshold may be a MTC specific threshold configured by the network. The threshold may be configured by the network for all devices in a no mobility state and/or the low mobility state. The network may have the option to configure different thresholds for different mobility states.

In another example, the network may provide a single predefined threshold and a scaling factor may be applied to this threshold depending on the mobility state. For example, the scaling factor may be signaled by the network. In response, the UE may scale a common threshold value, e.g., $S_{intrasearch}$, by this scaling factor. A different scaling factor may apply for no mobility and low mobility states, or the same scaling factor may apply.

In another example, when the serving cell measurement goes below a predefined threshold, the UE may wait for a certain predefined period of time before triggering neighbor cell measurements. In this scenario, if the serving cell measurement goes back above the predefined threshold prior to the expiration of the predefined period, the UE may continue to perform no neighbor cell measurements or perform neighbor cell measurements less frequently than in the normal mobility state.

The UE may measure less than all of its neighbor cells. Instead, a subset of the neighbor cells may be considered for measurements. The neighbor cells to be measured may be determined based on various factors. For example, the network may provide the UE with a subset of the UE's neighbor cells to measure, i.e., a reduced neighbor cell list. In another example, the network may provide the UE with a complete neighbor cell list but configure the UE to consider the 'N' best neighbor cells among them. In another example, the UE may detect the 'N' best neighbor cells in the region, and perform measurements on the 'N' best cells. The UE may detect the 'N' best neighbor cells to measure when a neighbor list is not provided and/or when the UE has detected other cells not on the neighbor cell list.

The neighbor list and the ranking of the 'N' best neighbor cells may be compiled in a number of ways. For example, the UE may measure all the neighbor cells and rank them according to received signal strength or the received signal quality or a combination of both. In this scenario, the 'N' best neighbor cells from the list may be part of future measurements, where 'N' may be a network configured value or a predetermined value. The UE may re-measure the neighbor cells and perform or revise the ranking if at least one or some or all the 'N' neighbor cell measurements go below a certain predefined threshold.

The UE may perform the measurements and ranking of the neighbor cells periodically based on a timer. This timer may have an absolute value specific to the state or may be derived from a common timer value and state specific scaling factors. In another embodiment, the UE may determine a reduced set of neighbors to measure based on the channel quality of the neighboring cells. More specifically, when entering a particular state, the UE may consider cells that are above a threshold (e.g., a network configured or predetermined threshold) as neighbors for measurement purposes in that state.

The UE may be designed to perform no measurements until specific triggering conditions are met. Examples of triggering conditions are described below. When a triggering condition is satisfied, the UE may perform measurements using timing and requirements for a normal mobility state or alternatively, using time and requirements defined for a low or no mobility state. For example, the UE may measure neighbor cells when the quality of the serving cell goes below a threshold.

In another example technique for optimizing UE in various mobility states, techniques are disclosed herein that incorporate a scaling factor for a cell reselection procedure. Thus, a scaling factor may be implemented for each mobility state for the cell reselection procedure. For example, a UE may use state specific cell reselection timer values for the cell reselection procedure. The timer may have absolute values for each state (e.g., a first value for the normal mobility state, a second value for the low mobility state, a third value for the no mobility state, a fourth value for the high mobility state, etc.) or may be derived from a common timer, e.g., $T_{reselection}$, using a scaling factor specific to each state. The scaling factor information element may be referred to as "low mobility speed factor" or "no mobility speed factor." In an embodiment for a low mobility device, for example, an absolute timer may apply. For the no mobility case, a scaling factor to be applied on the low mobility timer or the normal mobility timer may be provided.

The cell reselection timer values or scaling factors may be determined in a number of ways. In an example embodiment, the UE may be preconfigured with the cell reselection timer during its initial deployment. Alternatively, the timer values or scaling factors may be a part of the System Information or signaled by network in a radio resource control (RRC) message. In another embodiment, the UE may determine the timer values or scaling factors, and base the determination on the number of cell reselections performed during a predetermined period of time. The timer values and scaling factors may be adjusted dynamically based on the number of cell reselections that are performed during the predetermined period of time. In an example embodiment, the timer values and/or scaling factors may differ for different classes of UEs. For example, the timer values and/or scaling factors may be different for MTC devices than devices such as a user's cellular telephone. The timer values and/or scaling factors may be different for different classes of MTC devices.

For example, a UE may be in a no mobility or low mobility state and may apply the following scaling rules for intra-frequency measurements. In general, if $T_{reselection}$ is the length of the reselection timer for a UE in the normal mobility state, then to determine the length of the reselection timer in the low mobility state, the UE may multiply $T_{reselection}$ by the "low mobility speed factor." To determine the length of the reselection timer in the no mobility state, the UE may multiply $T_{reselection}$ by the "no mobility speed factor." Alternatively, to determine the length of the reselection timer in the no mobility state, the UE may multiply $T_{reselection}$ by the "no mobility speed factor" and the "low mobility speed factor." Similar rules may also apply to the inter-frequency and/or inter-RAT measurements. An "Inter-Frequency Scaling Factor for $T_{reselection}$" or an "Inter-RAT Scaling Factor for $T_{reselection}$" may also be applied to $T_{reselection}$ in addition to the no or low mobility speed factor.

In another example for optimizing a UE in various mobility states, the different mobility states may be characterized by reduced update procedures. Depending on the technology, a reduced area update procedure may refer to, but is not limited to, location area, tracking area, and/or routing area. For example, a UE in a low mobility state or a no mobility state may perform periodic area updates less frequently than in a normal mobility state or a high mobility state. In order to reduce the periodicity of such updates, a number of methods may be used.

In an example embodiment, a scaling factor may be applied to the configured non-access stratum (NAS) periodic timer. The NAS periodic timer may be used to determine how often a UE performs update procedures. For example, when the UE changes states, the NAS may also be notified as part of a UE coordination. The scaling factor may be provided ahead of time in the original NAS configuration message, it may be pre-configured in the UE or may be configured by the RRC sub-layer.

In another embodiment, a new periodic timer may be used in the various mobility states. In order to avoid reconfiguration of such timers with NAS signaling, each timer may be preconfigured in the original NAS configuration message in the UE. For example, the original NAS configuration may provide a timer specific to each applicable state (e.g., a first value for the normal mobility state, a second value for the low mobility state, a third value for the no mobility state, a fourth value for the high mobility state, etc.). When the UE enters a new state it may reconfigure the NAS periodic timer to the value that corresponds to the new mobility state. Alternatively, the timer may be configured by the RRC. The value may be broadcast or explicitly configured by the RRC. The periodic timers or scaling factors may be state dependent and may be used in any combination. For instance, more than one timer and scaling factor may exist depending on the possible UE states.

In another example for optimizing a UE in its various mobility states, UEs in different mobility states may use different DRX cycle lengths to monitor paging occasions. For example, a device in a low or no mobility state may use an extended DRX cycle length as compared to a device in a normal mobility state. The extended DRX cycle may be advantageous for MTC features such as Time Controlled, Mobile Originated-Only, or Extra Low Power Consumption, although the extended DRX cycle may be equally applicable to all UE devices in a low or no mobility state.

The DRX cycle length may be determined in a number of ways. For example, the DRX cycle length may be provided to the UE by the network via System Information or another form of dedicated signaling. Alternatively, the UE may be preconfigured with this information during initial deployment. In another example, an MTC server may configure an MTC device with this information via broadcast service or using paging. The DRX length may be MTC device group specific, MTC feature specific, and/or mobility state specific. The DRX values used may be state specific absolute values or may be derived from a common value using state specific scaling factor(s). A DRX value may apply for communication with a network when the UE transitions to or from a low or no mobility state, as is described in more detail below.

In another example for optimizing an MTC device in its various mobility states, the UE may alter how it acquires System Information. For example, in a no or low mobility state, a UE may need less than all the System Information being broadcast by the network. The UE may then monitor a modified subset of the System Information. For example, the UE may acquire System Information that is relevant to its current mobility state and ignore system information that is irrelevant to its current mobility state. In another example, the UE may acquire certain System Information later or less often in the low or no mobility state than it does in the normal mobility state.

The modified system information acquisition may be achieved in many different ways. For example, the network may page a no or low mobility state UE with a System Information change indication message which may indicate which System Information Blocks (SIBs) are relevant to the UE's current mobility state. The network may inform the UE of which SIBs that it may need to acquire. This may be achieved by introducing new information elements (IEs) to the existing paging message. The new IEs may be used to identify the UEs in a mobility state that is different than the normal mobility state and/or the SIBs they may need to be acquired for each relevant state.

Alternatively, the UE may be preconfigured with relevant SIBs for each state. For example, when a UE in a no or low mobility state receives a page indicating System Information modification, the UE may attempt to acquire the specific SIBs relevant to its current mobility state that have been modified since its last acquisition, while ignoring SIBs that are irrelevant to its current mobility state.

When paging a UE to acquire the state specific System Information, the network may also include the scheduling information for the SIBs in order to keep the UE from having to acquire the MIB in UMTS or SIB1 in LTE in order to obtain scheduling information. Additional IEs may be added to the paging message in order to allow scheduling information to be included in a page. Other modified System Information may be acquired by the UE from the network. For example, the network may provide the System Information to the UE when the UE establishes a connection. In another embodiment, the UE may acquire the System Information when it moves out of the low or no mobility states.

Figure 2:
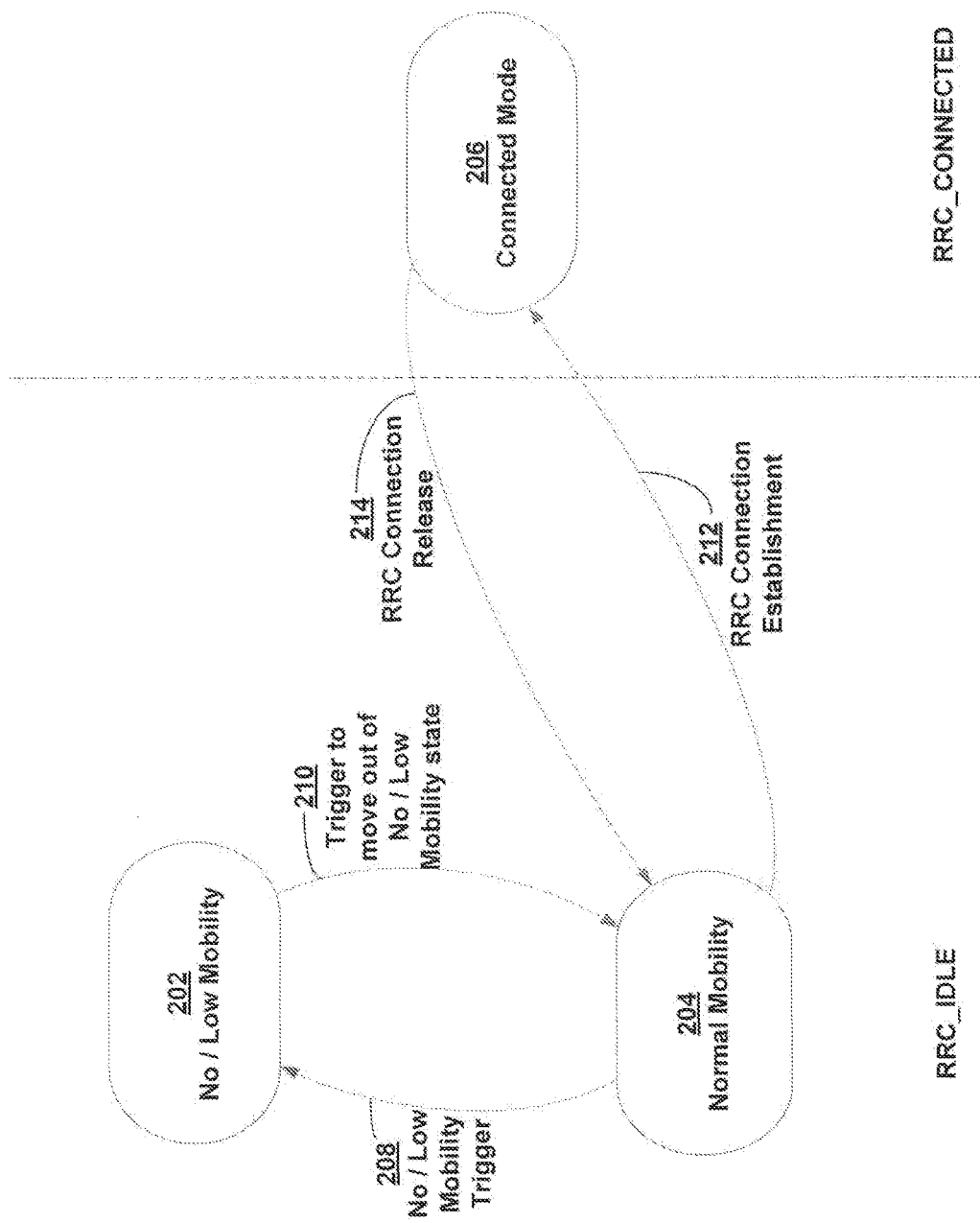
FIG. 2 is an exemplary state diagram for transitioning between mobility states for a UE with two mobility states in idle mode.

FIG. 2 illustrates an example of a UE operating with two mobility states while the UE is in Idle mode. The triggers used for state transitions are explained below. For example, a UE may be in the Normal Mobility State 204. Upon detecting a No/Low Mobility Trigger 208, the UE may transition to the No/Low Mobility State 202. While in the No/Low Mobility State 202, if the UE detects Trigger to move out of No/Low Mobility State 210, the UE may transition to Normal Mobility State 204. While in Normal Mobility State 204, if the UE detects RRC Connection Establishment 212, the UE may transition to RRC Connected Mode 206. While in RRC Connected Mode 206, if the UE detects RRC Connection Release 214 the UE may transition to Normal Mobility State 204. The No/Low Mobility State 202 and the Normal Mobility State 204 may correspond to a UE in Idle Mode. Although not shown in FIG. 2, in another embodiment, transitions between the No/Low Mobility State 202 and RRC Connected Mode 206 may be available based on triggers related to RRC connection establishment and or the characteristics of No/Low Mobility State 210.

Figure 3:
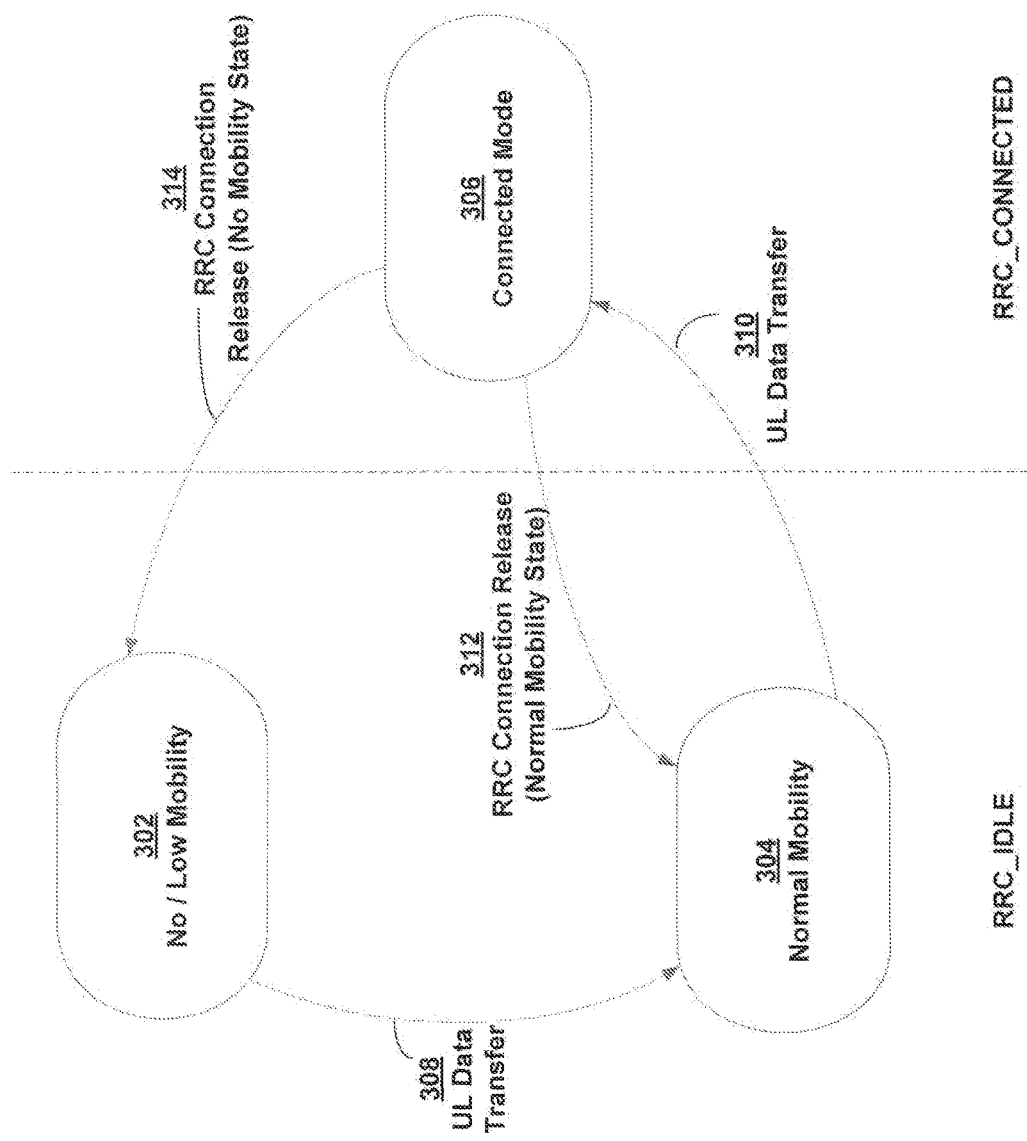
FIG. 3 is an exemplary state diagram for transitioning between mobility states for a UE with three mobility states in idle mode.

FIG. 3 illustrates an example of a UE operating with three mobility states while the UE is in idle mode. A UE may operate with multiple mobility states depending on various factors such as, but not limited to, UE capabilities, deployment scenario, MTC feature being supported, and the like. As shown, the UE may support multiple mobility states and transitions between states.

For example, a UE may be in the Normal Mobility State 304. Upon detecting Low Mobility Trigger 314, the UE may transition to the Low Mobility State 302. While in the Low Mobility State 302, if the UE detects Trigger to move out of Low Mobility 316, the UE may transition to Normal Mobility State 304. While in Normal Mobility State 304, if the UE detects RRC Connection Establishment 324, the UE may transition to RRC Connected Mode 308. While in RRC Connected Mode 308, if the UE detects RRC Connection Release 322 the UE may transition to Normal Mobility State 304. Upon detecting a No Mobility Trigger 318, the UE may transition to the No Mobility State 306. While in the No Mobility State 306, if the UE detects Trigger to move out of No Mobility 320, the UE may transition to Normal Mobility State 304. If while in No Mobility State 306 the UE detects Low Mobility Trigger 312, the UE may transition to Low Mobility State 302. While in Low Mobility State 302, if the UE detects No Mobility Trigger 310, the UE may transition to No Mobility State 306.

The Low Mobility State 302, the Normal Mobility State 304, and the No Mobility State 306 may correspond to a UE in Idle Mode. Although not shown in FIG. 3, in another embodiment, transitions between the Low Mobility State 302 and RRC Connected Mode 308 may be available based on triggers related to RRC connection establishment and/or the characteristics of Low Mobility State 302. Although not shown in FIG. 3, in another embodiment, transitions between the No Mobility State 306 and RRC Connected Mode 308 may be available based on triggers related to RRC connection establishment and/or the characteristics of No Mobility State 306.

Both FIGS. 2 and 3 illustrate the mechanisms that may trigger a UE transition into and out of no or low mobility state. The configuration of the states may occur during initial deployment or at a later stage. The states may be configured autonomously by the UE, by the network, and/or by the user. For example, the state transition may be performed implicitly by the UE and/or may be directed by the network. These triggers may be used individually or in any combination. The configuration may also be modified dynamically at any time. The triggers described below may correspond to No/Low Mobility Trigger 208, Trigger to move out of No/Low Mobility State 210, No Mobility Trigger 310, Low Mobility Trigger 312, Low Mobility Trigger 314, Trigger to move out of Low Mobility 316, No Mobility Trigger 318, Trigger to move out of No Mobility 320, and/or the like.

For example, if the source of power to a UE is detected to be from a power outlet, the UE may move into a no or low mobility state, recognizing that the connection to a power outlet indicates a stationary or low mobility location. Alternatively, when a change in the power source is detected, for example the power source changes to a battery, the UE may move out of the no or low mobility state. In an example embodiment, the UE may be configured or preconfigured to be in a specified state during initial deployment. For example, the UE may belong to a MTC subscription group or class that always operates in such states.

In another example, a man-machine interface (MMI) input may be available to the user to select the state. Mobile devices may have different profiles available for the user to select. These profiles may be used to configure various parameters such as ringtones, alerts (calls/short message service (SMS)), tasks, etc. Similarly, a mobility state for the UE may be added as a configurable option which a user may use to set the UE mobility state.

In another example, the trigger may come from an MTC server and may be communicated to an MTC device. For example, an MTC server/cell broadcast entities (CBE) may provide the state of the UE to the Cell Broadcast Centre (CBC) in the core network (CN) that forwards it to the corresponding radio network controllers (RNCs) and eventually to the (e)NBs. The (e)NB may then trigger the respective UE(s) to change their state.

In another example, when the network receives the information from the MTC server/CBE, the network may use a regular paging mechanism to move the device into or out of no or low mobility states. A new paging cause and/or new IE(s) may be added to the existing paging message. Alternatively, an existing paging cause or an existing IE may be modified to incorporate trigger.

In another example, a UE may move out of a no or low mobility state when there is UL data to transmit. The UE may re-enter the previous state when the RRC connection is released. Re-entering a no or low mobility state may be achieved in a number of ways. For example, the UE may return to the previous state immediately after RRC Connection release or after a predefined period of time. This time duration may be provided by the network or preconfigured in the UE. The network may explicitly indicate to the UE to go into a specified state in the RRC connection release message. In another example, the UE may transition to a low mobility state prior to returning to a no mobility state. For example, the UE may remain in the low mobility state for a predetermined time prior to returning to the no mobility state. The amount of time for which the UE may stay in the low mobility state before transitioning to no mobility state, may be provided by the network or the UE may have preconfigured timers for this purpose. In addition to these manners for re-entering a no or low mobility state, the re-entering may occur when a transition trigger is met.

Figure 4:
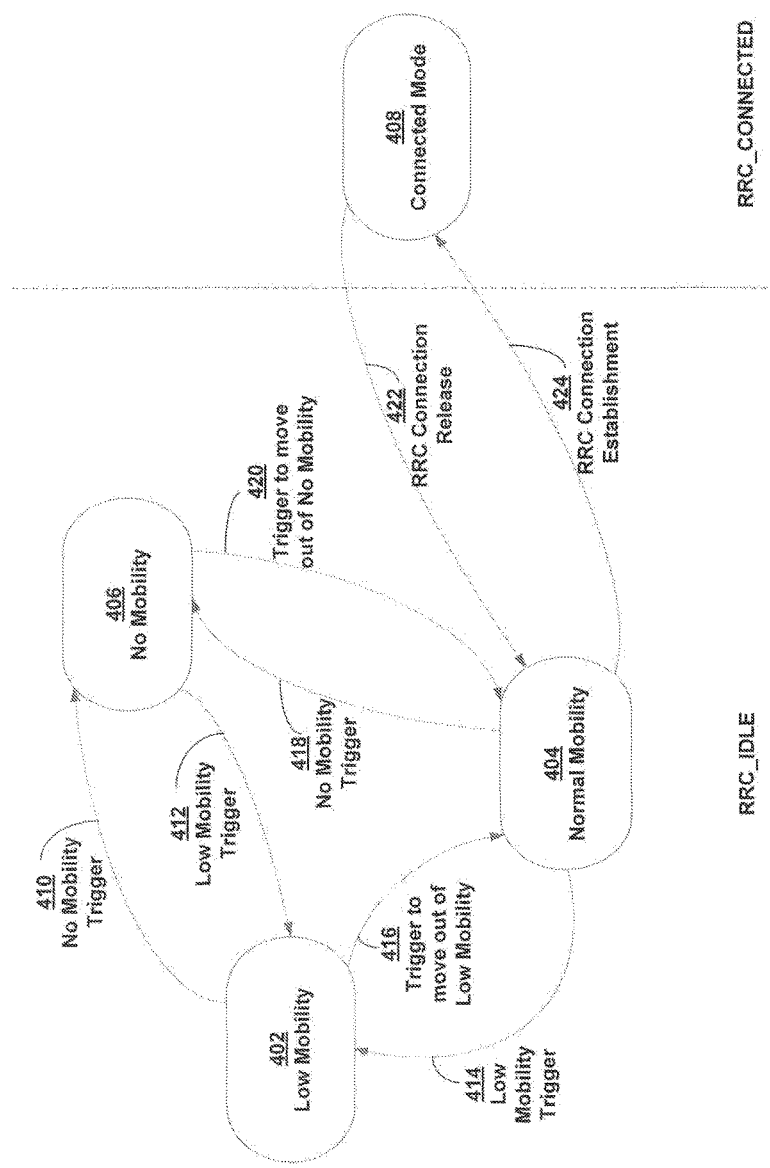
FIG. 4 is an exemplary state diagram for transitioning between mobility states based on an uplink (UL) data trigger.

FIG. 4 illustrates an example where UL data triggers the UE out of a no or low mobility state. The UE may start in No/Low Mobility State 402. Upon detecting UL Data to Transfer 408, the UE may transition to the Normal Mobility State 404. The UL may transition to RRC Connected Mode 406 based on detection of UL Data to Transfer 410. Although not shown in FIG. 4, in an example embodiment the UE may transition from No/Low Mobility State 402 directly to RRC Connected Mode 406 upon detecting UL data to transfer. While in RRC Connected Mode 406, the UE may detect the trigger for RRC Connection Release (Normal Mobility State) 412 and transition to Normal Mobility State 404. In another example, while in RRC Connected Mode 406, the UE may detect the trigger for RRC Connection Release (No/Low Mobility State) 414 and transition to No/Low Mobility State 402. The Network may direct the UE to transition from RRC Connected Mode 406 to No/Low Mobility State 402 or Normal Mobility State 404. In anther example, the network may direct the UE to transition from RRC Connected Mode 406 to Normal Mobility State 404 initially and to No/Low Mobility State 402 at some point in the future, for example after a specified period of time.

In another embodiment, the UE may use input from other technologies such as, but not limited to, a global positioning system (GPS) in order to detect the mobility of the UE. This input may be used to move the UE in to or out of a no or low mobility state. Different thresholds for the velocity of the UE may be defined in order to decide the state of the UE. Thresholds for velocity may be defined in any suitable manner. For example, an MTC specific threshold may be configured by the network. The network may have the option to configure different thresholds for different mobility states. The network may provide a single threshold and a scaling factor may be applied on this threshold depending on the mobility state.

In another example, a variation in the channel quality of the serving cell may trigger the UE to transition in and out of these states. If the channel quality of the serving cell remains constant or changes but stays within predetermined thresholds (e.g., a maximum channel quality threshold and a minimum channel quality threshold) for a predefined period of time, the UE may transition into or out of a no or low mobility state. Alternatively, if the channel quality varies more or less than a predefined threshold from an original channel quality measurement the UE may transition into or out of a no or low mobility state. Optionally, the variation may occur for a predefined period of time prior to triggering the transition. The original measurement time instance may be defined as the time of selection, the time of registration, the time of a previous cell reselection, the time of entering the current mobility state, etc. The thresholds and the time duration may be configurable parameters provided by the network or preconfigured in the UE. These parameters may be state specific absolute values or may be derived for each state from a common threshold using state specific scaling factors. In another example, if the serving cell channel quality is outside of a predetermined window or varies by more than a specified amount, the UE may move out of the a no or low mobility state. Similarly, rather than using the channel quality of a serving cell, the UE may monitor the channel quality of a neighbor cell to determine transition into and out of the no or low mobility states.

Another state transition trigger may be a change in the UE's location, which may trigger the UE transitioning into or out of a no or low mobility state. A trigger may be a change in the UE's neighbor cells or detected neighbor cells which may cause the UE to transition into or out of a no or low mobility state. The change in the channel quality of the neighboring cells may be a trigger. For example, if the quality of the detected neighbor cells and/or the 'N' best neighbor cells has remained within a window or has not varied by a threshold for a predefined period of time the UE may move into a no or low mobility state. If the UE is in a no or low mobility state and it detects that such variations have occurred it may move out of these states.

Another example of a trigger which may cause a UE to transition into or out of a no or low mobility state may be when a UE performs less than a predetermined number of cell reselections in a predetermined amount of time. For example, the UE may move out of the low or no mobility state if the number of cell reselections is greater than a predetermined number in a predetermined amount of time. Similarly, the UE may move into the low or no mobility state if the number of cell reselections is less than a predetermined number in a predetermined amount of time. The number of cell reselections to consider and the duration of time may be configurable. The parameters for this trigger may be provided by the network or the UE may be preconfigured with them. The parameters may be mobility state specific.

Another example trigger for a state transition may be based on fingerprint information. For example, if the UE is registered to a user's Home (e)NB (H(e)NB), for example an (e)Node B for the region including the user's house, detection the H(e)NB may act as trigger for the UE to move in to a no or low mobility state. Alternatively, the UE may move out of these states when the UE switches to a different (e)NB.

A state transition trigger may be when a manual closed subscriber group identification (CSG ID) selection is made. For example, when a manual CSG ID selection is made, the UE may explicitly look for a CSG cell that has the same CSG ID as the one selected by the user. This may indicate that the UE is confined to that particular cell and hence may move into a no or low mobility state. The UE may come out these states if, for example, the user selects another CSG ID manually or the user switches the UE to automatic CSG ID selection mode.

In another example, the mobility state information may be indicated in the SIBs for the Access Class to which the UE belongs. For example, it may be indicated in the SIBs as to which access class UEs might be considered a no or low mobility UEs. In another example, the network may explicitly configure the UE or set of UEs to move to such states via the RRC Connection release, a Paging message, during RRC connection setup, or in a RRC reconfiguration message, or the like.

The triggers described above may be used for transitions between the different mobility states, such as between a low or no mobility state and the normal mobility state. For example, the UE may move from normal mobility to low mobility first. Then, from the low mobility state, the UE may monitor the conditions to move back to normal mobility or to no mobility. Alternatively, the UE may transition directly from a normal mobility state to a no mobility state and vice versa.

In support of the state transitions, there may be some coordination between the UE and the network. For example, when the UE moves from no or low mobility state or to a normal mobility state, it may start operating according to the mobility state specific characteristics, procedures and parameters of a typical device in a normal state. For some parameters, such as the DRX period, periodic update timers, etc., the network and the UE may need to be synchronized. Methods to allow such coordination are described below.

Consider a situation in which state transition criteria are met. Coordination between the network and the UE may be desirable. In a first example, the UE may autonomously perform a state transition and not update the network. Alternatively, the UE may autonomously perform the state transition and indicate the state transition to the network. In another example, the UE may indicate to the network that the trigger has been met and wait for an explicit indication by the network to move to one of the configured states.

Consider the event of an autonomous state transition that requires the UE to update the network, or an event where the UE requests the network for a state transition. If the UE requests to change mobility states, the network may send the UE an accept or reject message indicating whether the transition is allowed. In idle mode, the UE may send an RRC Connection Request. A new cause may be defined for the requested state transition purpose. Alternatively, the UE may send a Connection Request with an existing cause and once connected, may send a NAS "mobility status update," or reuse an existing NAS message updated with a new IE. In another example, the UE may add a new IE indicating to the RRC that it has moved state, and the UE may indicate what state to which it has moved.

In the connected mode, a new RRC message may be defined that the network uses to direct the state transition in the UE. Alternatively, a new measurement report type may also be used for this purpose or an existing message with an updated information element may be introduced.

For example, consider the event of the reception of the mobility state change request/indication from the UE. The coordination between the network and UE may be a result of the network acknowledging, accepting, or rejecting the indication/request from the UE in the idle mode or connected mode. In the idle mode, a new IE may be added in the RRC Connection Setup message or a new RRC message may be defined. Alternatively, the UE expects an RRC connection reject message as an implicit indication that the network has received the message. Optionally, the network may also provide a new cause, indicating which state the UE should move to. Alternatively, a new NAS message can be defined or a new IE can be defined in an existing NAS message. In the connected mode, a new RRC message may be defined. Alternatively, a new IE may be added to the measurement control message. The new IE may be indicated to the UE via a RRC connection release message.

When directing the UE to perform a state transition, the network may coordinate with the UE by providing the UE with a period of time for which the UE should stay in this state. The network may dynamically modify the duration of this time period and provide the latest value to the UE during future state transitions. In the connected mode, this may be achieved via a measurement control message or any other existing or new RRC message.

In a coordinated state transition as described above, both the UE and network may be aware of the UE's operating state. Therefore, the state specific characteristics and parameters being used in each state may be known by both UE and network. In some scenarios, for example where the NAS pre-configures the area update timers for different states or when the RRC configures the area update timers, some additional coordination between the RRC and NAS sub-layer may be required. It may be beneficial to notify the NAS in order to allow the NAS to reconfigure the UE.

Thus, when the RRC is aware of a transition, an additional indication may be provided by the RRC to the NAS indicating that the UE has changed states. The indication may provide a new timer value that the UE is expected to use. This may be achieved internally in the network (e.g., RNC and eNode B to the NAS on the network side) and UE from AS to NAS internally. Alternatively, the UE may initiate a UL initial transfer or a NAS specific message to indicate the network side that such transition has occurred or that the UE is using a specific value or parameters. In another example, the NAS may receive this indication by the RRC on the network side and in turn initiate a NAS update procedure to update the configuration of the UE according to the new state. The UE may exchange information with the network, for example what DRX value it is using, timer values, etc. The network may provide the parameters and configuration to the UE for use when the network moves the UE to a new state.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for optimizing utilization of network resources by changing a state of a machine type communication (MTC) device, the method comprising:

receiving, by the MTC device, a message directing the MTC device to change from a first state to a second state, the message being received from a cellular network node based on signaling from an MTC server, the signaling from the MTC server comprising an instruction to change the state of the MTC device from the first state to the second state; and changing the MTC device from the first state to the second state in response to receiving the message, the MTC device configured to perform serving cell measurements and neighbor cell measurements less frequently in the second state as compared to the first state.

2. The method of claim 1, wherein, in the second state, the MTC device is further configured to stop neighbor cell measurements until serving cell measurements are below a predefined threshold.

3. The method of claim 1, wherein, in the second state, the MTC device is further configured to measure fewer neighbor cells as compared to the first state.

4. The method of claim 1, wherein, in the second state, the MTC device is further configured to perform cell reselection less frequently as compared to the first state.

5. The method of claim 1, wherein, in the second state, the MTC device is further configured to perform location area updates less frequently as compared to the first state.

6. The method of claim 1, wherein, in the second state, the MTC device is further configured to increase a length of a discontinuous reception (DRX) cycle.

7. The method of claim 1, wherein, in the second state, the MTC device is further configured to acquire system information less frequently as compared to the first state.

8. The method of claim 1, wherein the MTC server resides outside of a core network.

9. The method of claim 1, wherein the MTC device is configured to not perform serving cell measurements and neighbor cell measurements when in the second state.

10. A machine type communication (MTC) device comprising:
a processor configured to:
receive, by the MTC device, a message directing the MTC device to change from a first state to a second state, the message being received from a cellular network node based on signaling from an MTC server, the signaling from the MTC server comprising an instruction to change the state of the MTC device from the first state to the second state; and
change from the first state to the second state in response to receiving the message, the processor configured to perform serving cell measurements and neighbor cell measurements less frequently the second state as compared to the first state.

11. The MTC device of claim 10, wherein the processor is further configured to, in response to receiving the message, stop neighbor cell measurements until serving cell measurements are below a predefined threshold.

12. The MTC device of claim 10, wherein the processor is further configured to measure fewer neighbor cells in the second state as compared to the first state.

13. The MTC device of claim 10, wherein the processor is further configured to perform cell reselection less frequently in the second state as compared to the first state.

14. The MTC device of claim 10, wherein the processor is further configured to perform location area updates less frequently in the second state as compared to the first state.

15. The MTC device of claim 14, wherein the processor is further configured to increase a length of a discontinuous reception (DRX) cycle in the second state.

16. The MTC device of claim 10, wherein the processor is further configured to acquire system information less frequently in the second state as compared to the first state.

17. The MTC device of claim 10, wherein the MTC server resides outside of a core network.

18. The MTC device of claim 10, wherein the processor is configured to not perform serving cell measurements and neighbor cell measurements when in the second state.

19. A cellular network device comprising:
a processor configured to:
receive a signal from an MTC server, the signal indicating an MTC device and a first state, and the signal from the MTC server comprising an instruction to change the state of the MTC device from a second state to the first state;
transmit, in response to the signal, a message to the MTC device that triggers the MTC device to change from the second state to the first state, where the MTC device is configured to perform serving cell measurements and neighbor cell measurements less frequently in the first state as compared to the second state.

20. The network device of claim 19, wherein, when in the first state, the MTC device is further configured to stop neighbor cell measurements until serving cell measurements are below a predefined threshold.

21. The network device of claim 19, wherein, when in the first state, the MTC device is further configured to measure fewer neighbor cells as compared to the second state.

22. The network device of claim 19, wherein, when in the first state, the MTC device is further configured to perform cell reselection less frequently as compared to the second state.

23. The network device of claim 19, wherein, when in the first state, the MTC device is further configured to perform location area updates less frequently as compared to the second state.

24. The network device of claim 19, wherein, when in the first state, the MTC device is further configured to increase a length of a discontinuous reception (DRX) cycle.

25. The network device of claim 19, wherein, when in the first state, the MTC device is further configured to acquire system information less frequently as compared to the second state.

26. The network device of claim 19, wherein the MTC server resides outside of a core of the cellular network.

27. The network device of claim 19, wherein the MTC device is configured to not perform serving cell measurements and neighbor cell measurements when in the second state.

28. A method performed by a cellular network device, the method comprising:
receiving a signal from an MTC server, the signal indicating an MTC device and a first state, and the signal from the MTC server comprising an instruction to change the state of the MTC device from a second state to the first state;
transmitting, in response to the signal, a message to the MTC device that triggers the MTC device to change from the second state to the first state, where the MTC device is configured to perform serving cell measurements and neighbor cell measurements less frequently in the first state as compared to the second state.

29. The method of claim 28, wherein, when in the first state, the MTC device is configured to stop neighbor cell measurements until serving cell measurements are below a predefined threshold.

30. The method of claim 28, wherein, when in the first state, the MTC device is configured to measure fewer neighbor cells as compared to the second state.

31. The method of claim 28, wherein, when in the first state, the MTC device is configured to perform cell reselection less frequently as compared to the second state.

32. The method of claim 28, wherein, when in the first state, the MTC device is configured to perform location area updates less frequently as compared to the second state.

33. The method of claim 28, wherein, when in the first state, the MTC device is configured to increase a length of a discontinuous reception (DRX) cycle.

34. The method of claim 28, wherein, when in the first state, the MTC device is configured to acquire system information less frequently as compared to the second state.

35. The method of claim 28, wherein, when in the first state, the MTC device is configured to not perform serving cell measurements and neighbor cell measurements.

36. The method of claim 28, wherein the MTC server resides outside of a core network.

* * * * *